Jan. 24, 1956   R. A. VALCOURT ET AL   2,731,989
CROSS CUTTING TABLE SAW GAGE ATTACHMENT
Filed Feb. 3, 1955
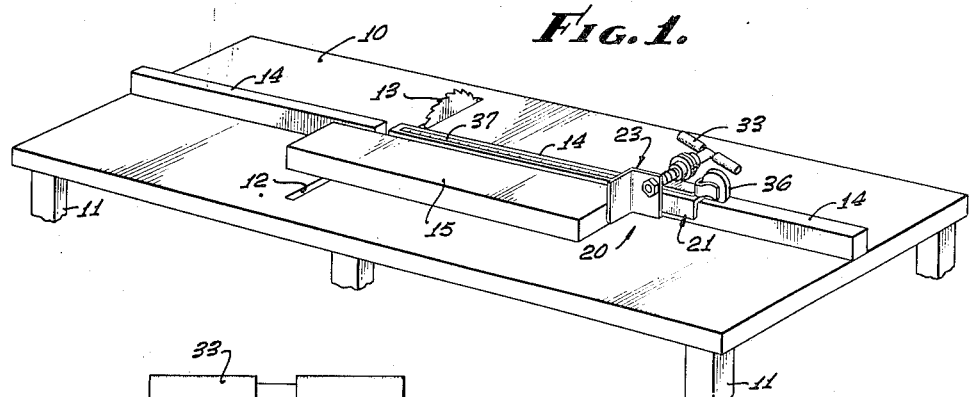
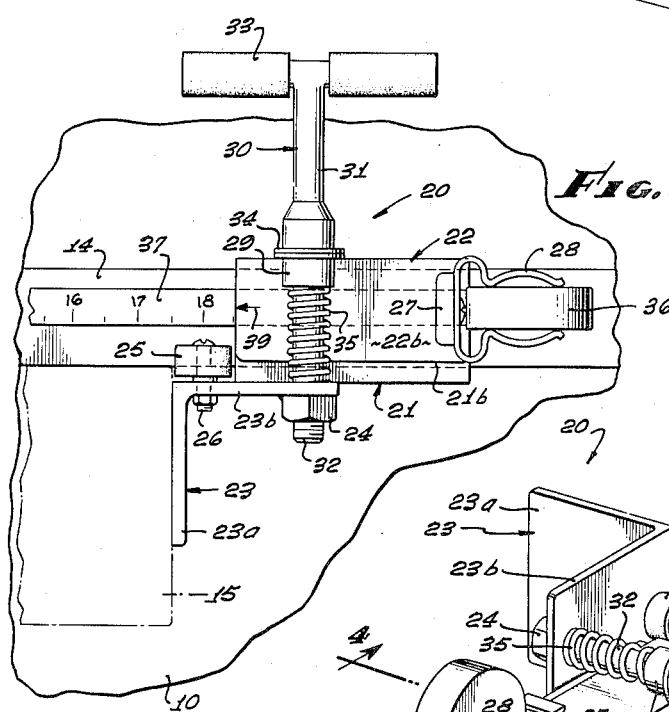
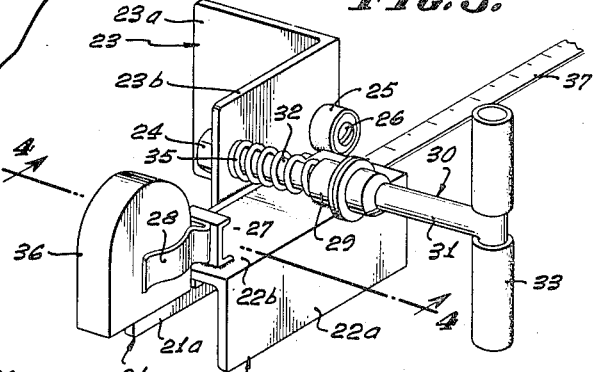
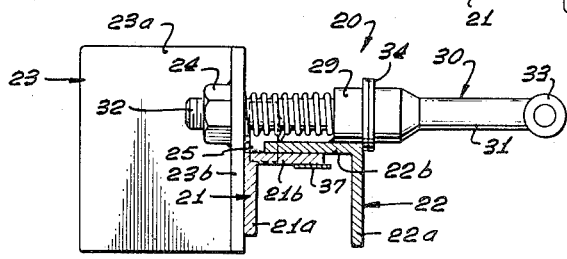
ROBERT A. VALCOURT
WRIGHT F. HUFF
INVENTORS.
BY *Robert Mednick*
ATTORNEY.

United States Patent Office 2,731,989
Patented Jan. 24, 1956

2,731,989

CROSS CUTTING TABLE SAW GAGE ATTACHMENT

Robert A. Valcourt and Wright F. Huff, Los Angeles, Calif.

Application February 3, 1955, Serial No. 485,912

10 Claims. (Cl. 143—174)

The present invention relates to a table saw used to support board lumber while it is being cut, and more particularly relates to a table saw attachment which may be selectively positioned on a table saw in order to provide a stop for board lumber to be cut on the table saw, said attachment functioning to automatically indicate the length of the cut board lumber.

Board lumber may be defined as lumber cut to given thicknesses and widths, and having several standard lengths. For the construction of dwellings, commercial, industrial, and other similar structures, it is necessary that the board lumber be cut to predetermined lengths as indicated by plans and specifications for the particular structure. This may be accomplished by means of a table saw upon which the board lumber is placed to enable a rotary saw associated therewith to cut the board lumber. The table saw is provided with a straight edge or a longitudinal vertical abutment to provide a side stop, and an end stop to position the board lumber being cut by the rotary saw.

At the present time, it is common for the saw operator to measure the distance from a transverse slot, in the table in which movable saw travels, along the straight edge or longitudinal vertical abutment on the upper surface of the table to a desired length, then stop means such as a nailed board is attached to the table in order to provide an end stop for the board lumber to be cut. Accordingly, the movable saw will cut the board lumber to the measured length when the side of the board lumber rests against the straight edge and one end of the board lumber rests against the provided end stop.

It is, therefore, an object of this invention to provide a table saw attachment which may be selectively positioned on a table saw in order to provide an automatically measured end stop for board lumber to be cut on the table saw.

Another object of the invention is to provide a table saw attachment which may be easily and quickly installed upon any usual table saw for cutting board lumber.

An additional object of this invention is to provide a table saw attachment which may be quickly and easily positioned on a table saw for cutting board lumber at different selected lengths.

A further object of this invention is to provide a table saw attachment which is economical in construction and can be utilized with commonly used table saws for cutting board lumber.

The novel features which are believed to be characteristic of the invention, both as to its organization and method of operation will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Fig. 1 is a perspective view of a table saw for cutting board lumber having the table saw attachment of this invention attached thereto ready for operation.

Fig. 2 is an enlarged partial top view of the table saw shown in Fig. 1 showing it in more detail.

Fig. 3 is a perspective view of the table saw attachment.

Fig. 4 is a side view of the table saw attachment as seen along line 4—4 of Fig. 3.

Referring now to Fig. 1 there is shown a table saw having a flat top surface 10 and leg supports 11, said flat top surface having a cut-out section or slot 12 to enable rotary blade 13 of a movable rotary saw mounted on the underside of flat top surface 10 to freely move therethrough. On the upper surface and along the length of flat top surface 10 and attached thereto is a straight edge or longitudinal vertical abutment 14 which may be a 2 x 4 piece of lumber or any other convenient size, said straight edge 14 having a cut-out portion to correspond with cut out section 12 of flat top surface 10. Board lumber such as designated by number 15 which is to be cut to a predetermined length may be placed on the upper surface of flat top surface 10 and against straight edge 14 as shown in Fig. 1 while rotary blade 13 as it is moved through cut-out section or slot 12 cuts board lumber 15. Means is provided (although not shown) to move rotary blade 13 along the length of cut-out section 12.

It is customary, in the prior art, to provide a fixed stop a given measured distance from the cut-out section and next to the longitudinal vertical abutment, in order to enable several pieces of board lumber to be cut at the same length. Then the board lumber may be placed with its long end against the straight edge and one end of the board lumber against the stop thereby consecutively cutting the board lumber to the same length. It is of course necessary to measure the distance of the end stop from the cutout section in order to determine the length of the cut board lumber after being cut by the rotary blade of the table saw.

If different lengths of board lumber are required then it would be necessary to move the end stop to the required measured distances for cutting the board lumber at the different lengths. It is the principle of the attachment of this invention to provide a new means which is economically constructed to provide such a stop, said attachment being conveniently and quickly movable to a new position and at the same time measuring and giving a visual indication of the measured distance in order to determine the lengths of the board lumber that would be cut by the rotary saw.

Said table saw attachment is generally designated by numeral 20 and is removably and slidably attached to straight edge 14 as seen in Fig. 1. Fig. 2 shows an enlarged partial top view of the table saw and the attachment as seen in Fig. 1. In Fig. 3 there is shown a perspective view of the table saw attachment 20, and in Fig. 4 there is shown a front view of table saw attachment 20 as seen on lines 4—4 in Fig. 3. Referring now more particularly to the figures the table saw attachment 20 of this invention has two L-shaped plate angles 21 and 22 having vertical sides 21a and 22a and horizontal sides 21b and 22b, respectively. Horizontal side 22b is slidable on the top side of horizontal side 21b. Vertical side 21a of L-shaped plate angle 21 is welded or attached in a similar manner to an L-shaped stop angle 23, said stop angle 23 having a first side 23a and a second side 23b. On the left side of second side 23b is a nut 24 having an inside threaded surface for engaging a similarly threaded rod, said nut 24 being permanently attached to side 23b by for example being welded thereto. On the right side of second side 23b is a freely rotating wheel 25 mounted on an axle 26 connected to second side 23b. Said wheel 25 is located slightly above plate angle 21.

Plate angle 22 has a vertical extension 27 to provide a support for a spring clamp 28 attached thereto. Also on the top surface of horizontal side 22b of plate angle 22 and integral therewith is a journal section 29 which has a center bore (not shown) of a diameter approximately that of the nut 24. Extending through the base of journal section 29 is a rod 30 having a first section 31 and a second section 32. First section 31 has a handle 33 on one end and a circular extension or flanged portion 34 on the other end, said flanged portion 34 having a flat face to match and freely rotate on the corresponding flat face of journal section 29. Second section 32 is of a sufficient diameter so that it freely rotates within the bore of journal section 29, and has its other end threaded to engage nut 24. Surrounding second section 32 of rod 30 is a spring 35 to provide spring bias between second side 23b of stop angle 23 and journal section 29.

It will now be seen that by rotating handle 33 the distance between the vertical sides 21a and 22a of plate angles 21 and 22 will vary. Spring 35 will cause flanged portion 34 to bear against journal section 29 thus preventing any movement of plate angles 21 and 22 except that caused by manual rotation of handle 33, said spring 35 functioning to separate and pressurably hold apart vertical sides 21a and 22a of plate angles 21 and 22, respectively. The last mentioned elements act similarly to a vise.

The attachment 20 of this invention is connected to straight edge or longitudinal vertical abutment 14 by placing it so that vertical sides 21a and 22a span the width of straight edge 14 and then by rotating handle 33 to cause the vertical sides 21a and 22a to bear against the sides of straight edge 14 until it is gripped in a vise-like fashion, as seen in Fig. 1 and Fig. 2. In order to move the attachment along straight edge 14, handle 33 may be rotated to release the pressure of vertical sides 21a and 22a from the sides of straight edge 14. Then the attachment may be easily moved along the length of straight edge 14 by tilting the attachment so that roller 25 may roll on the top surface of straight edge 14.

It will be noted that rod 30, extending through journal section 29 and being threadably connected to stop angle 23, holds the L-shaped plate angles 21 and 22 in position to form a U-shaped bracket thereof in order to enable said L-shaped plate angles 21 and 22 to grip the vertical abutment on the upper surface of the table. Said rod 30 and journal section 29 threadably connected to stop angle 23 provides variable means for varying the width of the U-shaped bracket which in addition to spring 35 results in adjustable means for this table saw attachment. The adjustable means enables the table saw attachment to be quickly and easily removed from ore differently positioned on vertical abutment 14 or a vertical abutment of a different width on another table saw.

Referring again to Fig. 1, there is seen a measuring device such as a carpenter's scale 36 which is held in place by spring clamp 28. The carpenter's scale 36 is of the type in which its blade 37, containing indications of length measurements, would automatically retract within the container of carpenter's scale 36 unless restrained by an external force. Carpenter's scale 36 is positioned in clamp 28 so that its blade 37 extends underneath plate angle 21 and along the top surface of straight edge 14. The end of blade 37 is permanently secured to the top surface of straight edge 14 so that the arrow marking 39 on the top surface of horizontal section 22b of support 22 indicates the length of board lumber that would be cut by rotary blade 13.

In operation, the attachment 20 is positioned on straight edge 14 for a predetermined length of board lumber to be cut by the rotary blade 13 as indicated by arrow 39 and blade 37 of scale 36. A piece of board lumber is placed on the table top surface 10 and having its long side bear against straight edge 14 and one of its ends bear against side 23a. Then rotary blade 13 is caused to move in cut-out or slot 12 to cut the piece of board lumber; this operation may be repeated as desired. If a different length of board lumber is required, then the attachment of this invention may be quickly moved to a new position on straight edge 14 and the above cutting operation can be quickly commenced.

For a given table saw, the spring clamp of the table saw attachment may be dispensed with by the use of permanent measured indices on the top surface of longitudinal vertical abutment 14. Then arrow marking 39 will point to the measured distance. Another alternative would be to permanently secure a measuring device or tape to the top surface of longitudinal vertical abutment 14. As many table saws now in use haven't any permanently measuring device, then the use of a carpenter's scale secured by the spring clamp would be an added convenience.

In the foregoing description, it was considered that the board lumber would be transversely cut with respect to its length. However, it may be desirable to cut the board lumber at a predetermined angle or at several different angles. In that case stop angle 23 can be constructed so that first side 23a bears the desired angular relation with respect to second side 23b. Also, instead of welding stop angle 23 to plate angle 21, it might be desirable to have them removably connected by bolts or the like.

The utility of the above-described combination lies in its simplicity of construction, its adaptability to quick and easy positioning for cutting different lengths of board lumber, and its combined operation in providing both a stop for positioning board lumber and a visual indication of the length of the board lumber to be cut by the use of the table saw.

Having herein described the invention, what is claimed as new is:

1. A table saw attachment for a table having a saw movable in a slot thereacross and a longitudinal vertical abutment on the upper surface of the table to provide a side stop for lumber to be cut on the table by the saw, said table saw attachment comprising: a pair of L-shaped plate angles, each L-shaped plate angle having a vertical and a horizontal side; a stop angle having a first side connected to the vertical side of one of the L-shaped plate angles and having a second side extending at an angle with respect to the first side to provide an end stop for lumber to be cut on the table and resting against the vertical abutment; and adjustment means including variable means connected to the first side of the stop angle and to the other L-shaped plate angle to form a U-shaped bracket of the pair of L-shaped plate angles, and spring means supported by the variable means to pressurably separate the L-shaped plate angles, said variable means being capable of varying the width of the U-shaped bracket against the pressure of the spring means in order to grip the width of the longitudinal vertical abutment on the upper surface of the table.

2. The attachment according to claim 1 which additionally includes a spring clamp connected to the U-shaped bracket for holding a measuring device.

3. The attachment according to claim 2 which additionally includes a measuring device retained by the spring clamp and capable of being connected to the vertical abutment.

4. The attachment according to claim 1 which additionally includes a freely rotable wheel connected to the first side of the stop angle above the horizontal side of one of the L-shaped plate angles.

5. The attachment according to claim 1 wherein the second side of the stop angle extends at a right angle relationship with respect to the first side.

6. A table saw attachment for a table saw comprising: a pair of L-shaped plate angles, each L-shaped plate angle having a vertical and a horizontal side; a stop angle having a first side connected to the vertical side of one of the L-shaped plate angles and having a second side extending at a predetermined angle with respect to the first side and to the vertical side of said one of the L-shaped plate angles in order to provide a stop for lumber to be cut on the table saw; variable means connected to the first side of the stop angle and to the other L-shaped plate angle to form a U-shaped bracket of the pair of L-shaped plate angles; and spring means supported by the variable means to pressurably separate the L-shaped plate angles, said variable means being capable of varying the width of the U-shaped bracket against the pressure of the spring means.

7. A table saw attachment for a table having a saw movable in a slot thereacross and a longitudinal vertical abutment on the upper surface of the table to provide a side stop for board lumber to be cut on the table by the saw, said table saw attachment comprising: a first L-shaped plate angle having a vertical and a horizontal side; a second L-shaped plate angle having a vertical and a horizontal side; a stop angle having a first side fixedly connected to the vertical side of the first L-shaped plate angle and having a second side extending at a right angle with respect to said first side and to the vertical side of the first L-shaped plate angle to provide an end stop for board lumber to be cut on the table and resting against the vertical abutment; a journal section fixedly connected to the horizontal side of the second L-shaped plate angle; variable means having a first and a second rod section alignably connected at one end thereof, and a handle connected to the other end of the first section, said one end of the first rod section having a flanged portion to bear against the journal section, said one end of the second rod section being supported by the journal section and the other end thereof being threadably engageable with the first side of the stop angle, said variable means holding the first and second L-shaped plate angle to form a U-shaped bracket thereof; and spring means supported by the variable means to pressurably separate the L-shaped plate angles, said variable means being capable of varying the width of the U-shaped bracket against the pressure of the spring means.

8. The attachment according to claim 7 which additionally includes a spring clamp connected to the U-shaped bracket for holding a measuring device.

9. The attachment according to claim 8 which additionally includes a measuring device retained by the spring clamp and capable of being connected to the vertical abutment.

10. The attachment according to claim 7 which additionally includes a freely rotatable wheel connected to the first side of the stop angle above the horizontal side of the first L-shaped plate angle.

References Cited in the file of this patent

UNITED STATES PATENTS

| | | |
|---|---|---|
| 1,566,225 | Mills | Dec. 15, 1925 |
| 2,381,564 | Taylor | Aug. 7, 1945 |
| 2,485,274 | Garrett | Oct. 18, 1949 |
| 2,571,569 | Greenwood | Oct. 16, 1951 |